Oct. 12, 1954 A. G. SPUGIOS ET AL 2,691,440

PACKAGE FOR PHONOGRAPH RECORDS

Filed Feb. 2, 1953

INVENTOR.
WILLIAM PRYOR MARSHALL
ARISTOS GEORGE SPUGIOS
BY
ATTORNEY

Patented Oct. 12, 1954

2,691,440

UNITED STATES PATENT OFFICE 2,691,440

PACKAGE FOR PHONOGRAPH RECORDS

Aristos George Spugios and William Pryor Marshall, Kalamazoo, Mich.

Application February 2, 1953, Serial No. 334,512

3 Claims. (Cl. 206—62)

This invention relates to a package particularly designed for holding phonograph records and adapted to protect the sound grooves of the records.

Conventional phonograph records are fragile and must be carefully packed for transport and storage. The material from which records are made is also comparatively soft and contact between this material and hard surfaced materials usually damages the record. Damage occurring in the grooved area of the record usually results in a reduction of fidelity and reproduction qualities.

It is to avoid these difficulties that our invention provides a package giving the record positive protection about its periphery and across its broad surfaces. Our package provides support for the record along the ungrooved periphery and at the ungrooved center portion. Although it does not contact the grooved surfaces of the record, the package prevents injurious dust from being deposited on these surfaces. The package is designed for economical production and to provide a package of minimum weight and bulk.

These and other objects and purposes of our invention will be immediately seen by those acquainted with the packaging of phonograph records upon reading the following specification and the inspecting of the accompanying drawings.

Figure 1:
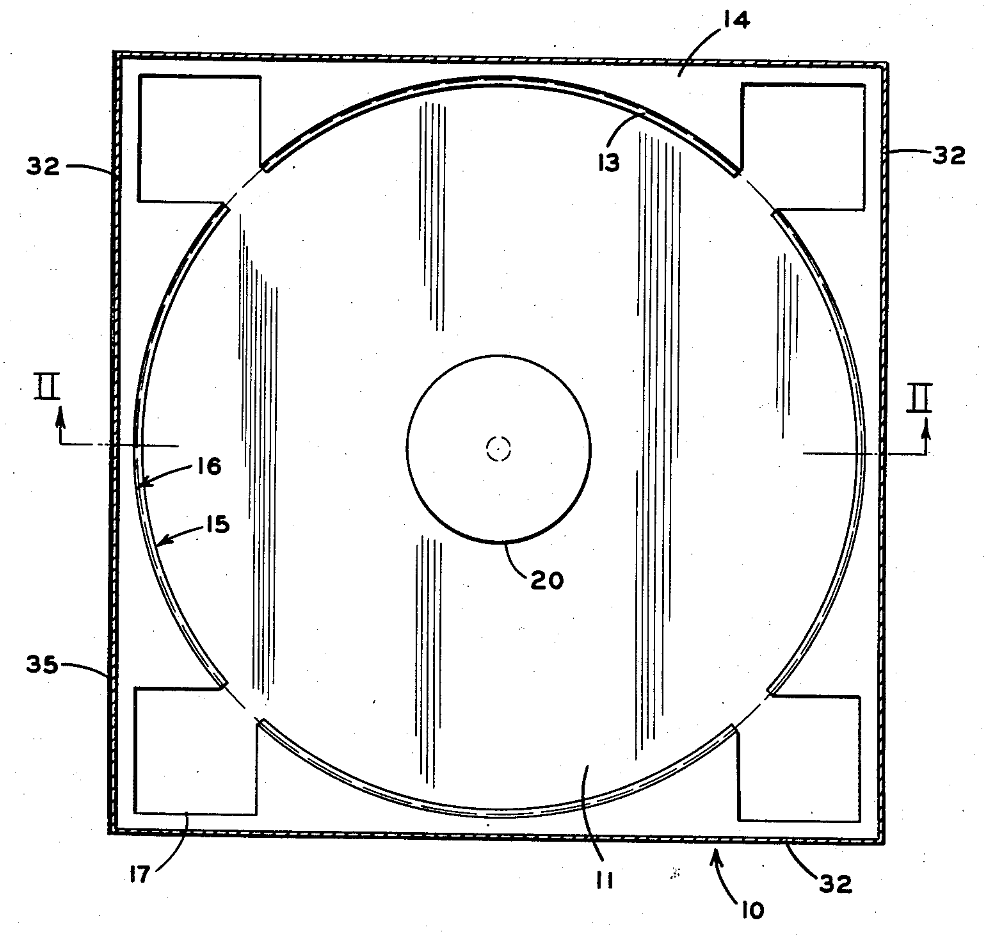
Figure 1 is a sectional view taken along the plane I—I of Figure 2.
Figure 2:
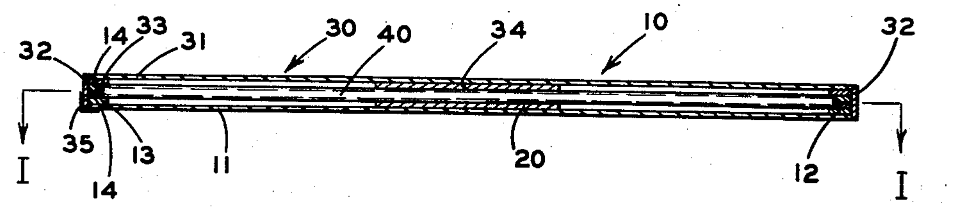
Figure 2 is a sectional view taken along the plane II—II of Figure 1.

The package 10 has a square, rigid bottom member 11 somewhat longer and wider than the diameter of a record of the desired size. Mounted on the bottom member 11 is a flat body member 12, which is made up of a support element 13 and a pair of spacers 14. The support element 13 and the spacers 14 are each of square outline the same size as the bottom member 11 and each provided with a central, circular opening therethrough. The openings in the support element 13 and spacers 14 are concentric. The opening through the spacers 14 is of greater diameter than the opening through the support element 13 providing a radially inwardly extending lip 15 on the support element. The central opening through the spacers 14 is slightly larger than the diameter of the record to be seated in the package while the opening 16 through the support element 13 is less than the peripheral diameter of the record but greater than the diameter of the grooved portion of the record.

Substantially square relief openings 17 are provided at each corner of the support element 13 and the spacers 14. The relief openings 17 communicate with the central opening through the body member 12. These relief openings 17 provide easy removal of the record and reduce its weight. They also facilitate manufacture by providing a minimum of contact between the mitered edges of the materials making up the support element 13 and the spacers 14 when these items are fabricated from several parts. At the same time, without impairing the strength of the package, they effect an appreciable reduction in weight. Mounted at the center of the bottom member 11 is a circular pad 20 of the same thickness as the support element 13. The diameter of the pad 20 is large enough to provide adequate support for the center of the record but not large enough to contact the grooved portion of the record.

It will be recognized that while the body member is described as composed of three separate pieces it could be fabricated from fewer components. The two spacers could be combined in a single piece, and the spacers and the support element could be made from a single sheet of material.

The package is closed by a cover 30 having a top member 31 identical in size and shape to the bottom member 11 and sides 32. The sides 32 are designed to seat over the edges of the bottom member 11 and the body member 12 and enclose them. Secured to the inside surface of the top member 31 is a clamping element 33 identical in size and shape to the support element 13. A pad 34, identical in size and shape to the pad 20, is secured to the geometric center of the inside surface of the top member 31. The cover is secured to the bottom member 11 by a hinge 35 of any suitable construction. In this embodiment it is a heavy fabric strip adhesively secured to one of the side members 32 and to the bottom surface of the bottom member 11. Alternatively, the said one side member 32 may be secured to the body member 12 and the hinge provided between the said side member and the top member 31.

The various components of our package may be fabricated from any suitable material such as cardboard, plastic or wood. Cardboard is a preferable material since it provides sufficient rigidity while being light weight and comparatively inexpensive. The various components of our invention are fastened together by suitable means such as stapling or adhesives suited to the type of material used in the fabrication of the package. If a resilient contact is desired between the package and the record, the internally exposed surfaces of the support elements 13 and 33, the spacers 14 and of the pads 20 and 34 may be flocked. Such additional precaution, however, is not normally considered necessary.

*Operation*

With the cover open, a record 40 is placed in the package. The record will seat upon the lip 15 of the support element 13 within the central opening 16 in the spacers 14. Only the ungrooved periphery of the record will contact the lip 15. At the same time, the ungrooved center of the record will contact, and be supported by, the upper surface of the pad 20. The internal edges of the spacers 14 seat closely about the record preventing any substantial lateral movement of the record within the package. The cover 30 is then closed bringing the clamping element 33 into contact with the ungrooved portion of the opposite face of the record, thus clamping the record between the elements 13 and 33. At the same time, the central pad 34 also engages the ungrooved center of the record. Movement of the record in any direction is substantially prevented. Since the record cannot move within the package, it cannot build up momentum and be shattered by sudden contact with the package. The pads 20 and 34 provide support for the center of the record, eliminating any strain which might occur due to the thin peripheral support provided by the rest of the package. The support element 13, and pad 20 space the bottom member 11 from the record's lower surface. The clamping element 33 and pad 34 space the top member 31 from the record's upper surface. This eliminates all contact between the package and the grooved portion of the record.

The closed cover may be secured by any suitable means. If the package is designed only for shipping purposes, it is preferably taped shut. However, any type of reusable fastening means may be substituted.

In removing the record the relief openings 17 provide a convenient access to the edge of the record to lift it out of the package. This eliminates the necessity for tipping the package until the record falls from its nested position. The package provides protection for the record on all sides, particularly protecting it from damage due to being dropped on its edge. The package has various other advantages including compactness and dust free storage.

It will be understood that various minor modifications of our invention may be made without departing from the principle thereof. Each of these modifications is to be considered as included in the hereinafter appended claims unless these claims by their language expressly state otherwise.

We claim:

1. In a package, the combination comprising: a flat circular disk; similar, flat, rectangular top and bottom elements of greater width and length than the diameter of said disk; identical flat, rectangular clamping and support elements similar in width and length to said top and bottom elements, respectively, said clamping and support elements being parallel with and secured to said top and bottom elements, respectively, and having identical, central, circular openings therethrough, slightly smaller in diameter than said disk; a flat, rectangular spacer similar in width and length to said support elements and of substantially the same thickness as said disk, said spacer being parallel with and secured to said support element and having a central, circular opening therethrough slightly larger in diameter than said disk and concentric with said support element opening; means providing similar relief openings through said spacer and support element adjacent the corners thereof, said relief openings communicating with their respective central openings along coincident portions thereof; a side element secured to said top element along the edges thereof and extending perpendicularly from said top element past said clamping element a distance at least equal to the combined thicknesses of said spacer and support element; and a hinge secured to said bottom element, along one edge thereof, and to the adjacent portion of said side element, said clamping element being adjacent to said spacer and their central openings being concentric when said top and bottom elements are parallel.

2. In a package for a flat circular disk, the combination comprising: similar, flat, rectangular top and bottom elements of greater width and length than the diameter of said disk; identical flat, rectangular clamping and support elements similar in width and length to said top and bottom elements, respectively, said clamping and support elements being parallel with and secured to said top and bottom elements, respectively, and having identical, central, circular openings therethrough, slightly smaller in diameter than said disk; a flat, rectangular spacer similar in width and length to said support element and of substantially the same thickness as said disk, said spacer being parallel with and secured to said support element and having a central, circular opening therethrough slightly larger in diameter than said disk and concentric with said support element opening; means providing similar relief openings through said spacer and support element adjacent the corners thereof, said relief openings communicating with their respective central openings along coincident portions thereof; a side element secured to said top element along the edges thereof and extending perpendicularly from said top element past said clamping element a distance at least equal to the combined thicknesses of said spacer and support element; and a hinge secured to said bottom element, along one edge thereof, and to the adjacent portion of said side element, said clamping element being adjacent to said spacer and their central openings being concentric when said top and bottom elements are parallel.

3. In a package for a flat circular disk, the combination comprising: similar, flat, top and bottom elements each being larger in lateral dimensions than the diameter of said disk; identical, flat, clamping and support elements similar in peripheral shape to said top and bottom elements, respectively, said clamping and support elements being parallel with and secured to said top and bottom elements, respectively, and having identical, circular openings therethrough, slightly smaller in diameter than said disk; a flat spacer similar in peripheral shape to said support element and of substantially the same thickness as said disk, said spacer being parallel with and secured to said support element and having a circular opening therethrough slightly greater in diameter than said disk and concentric with said support element opening; a pair of pads positioned on facing surfaces of the top and bottom elements, concentric with the opening in said spacer and each of substantially the thickness of said clamping elements; a side element secured to said top element and extending perpendicularly therefrom past said clamping element; and a hinge secured to said bottom element and said side element along corresponding portions thereof, said clamping element being adjacent to said spacer and their circular openings being concentric, and said side element enclosing said spacer and said support element when said top and bottom elements are substantially parallel.

References Cited in the file of this patent

UNITED STATES PATENTS

| Number | Name | Date |
|---|---|---|
| 441,228 | Cherbonnier | Nov. 25, 1890 |
| 774,037 | Burgi | Nov. 1, 1904 |
| 881,950 | Progler | Mar. 17, 1908 |
| 1,201,775 | Tufts | Oct. 17, 1916 |
| 1,320,958 | Albrecht | Nov. 4, 1919 |
| 1,611,575 | Aulbach | Dec. 21, 1926 |
| 2,258,535 | Buranelli | Oct. 7, 1941 |